United States Patent [19]

Cronenberger et al.

[11] Patent Number: 4,702,835

[45] Date of Patent: Oct. 27, 1987

[54] SEMI-PERMEABLE MEMBRANE STRUCTURE THAT IS PARTICULARLY SUITABLE FOR PLASMAPHERESIS

[75] Inventors: Michel Cronenberger, Mornant; Paul Lateltin, Seyssuel; Robert Rustant, Lissieu, all of France

[73] Assignee: Rhone-Poulenc Specialites Chimiques, Courbevoie, France

[21] Appl. No.: 497,048

[22] Filed: May 23, 1983

[30] Foreign Application Priority Data

May 28, 1982 [FR] France ................ 82 09527

[51] Int. Cl.4 ............................. B01D 13/00
[52] U.S. Cl. .................. 210/321.72; 210/445; 210/451
[58] Field of Search .......... 210/321.1, 321.2, 321.3, 210/321.4, 433.1, 433.2, 445, 446, 450, 451, 453, 456, 927

[56] References Cited

U.S. PATENT DOCUMENTS

| 3,074,559 | 1/1963 | Savino | 210/321.3 |
| 3,212,642 | 10/1965 | Kylstra | 210/321.3 |
| 3,501,010 | 3/1970 | Critchell et al. | 210/321.1 |
| 3,556,302 | 1/1971 | Agranat | 210/321.1 |
| 3,567,028 | 3/1971 | Nose | 210/232 |
| 3,623,614 | 11/1971 | Schmidt, Jr. | 210/346 |
| 3,627,137 | 12/1971 | Bier | 210/321.3 |
| 3,695,445 | 10/1972 | Esmond | 210/321.3 |
| 4,212,742 | 7/1980 | Solomon et al. | 210/346 |

FOREIGN PATENT DOCUMENTS 2420976  11/1979  France ............... 210/321.2

Primary Examiner—David L. Lacey
Attorney, Agent, or Firm—Burns, Doane, Swecker & Mathis

[57] ABSTRACT

A semi-permeable membrane structure that is particularly adapted for plasmapheresis includes a frame having two tubes each forming an internal conduit opening inside the frame, and a membrane on either side of the frame, each membrane being mounted with its periphery disposed on the frame. Two external rigid plates each having a suitable support for a membrane on its internal face clamp the frame and membrane between themselves. Appropriate structure is provided for keeping the two rigid plates fixed to one another and thereby maintaining the spatial relationship of the frame, membranes and plates.

10 Claims, 12 Drawing Figures

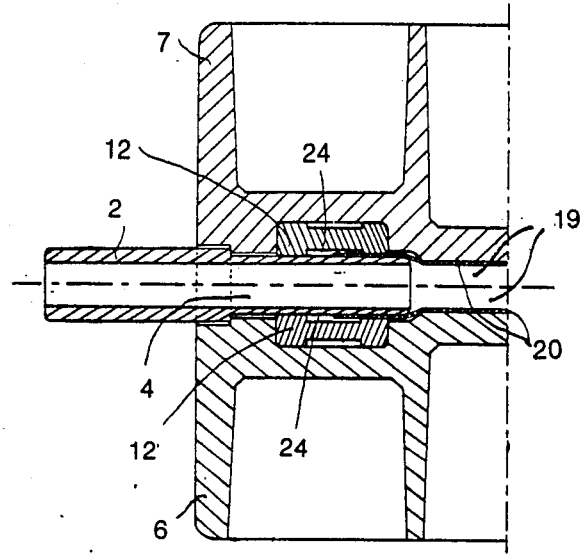
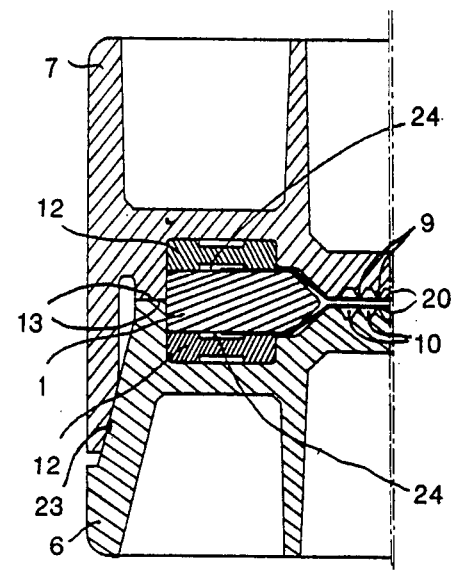
FIG. 6　　　　　　FIG. 5
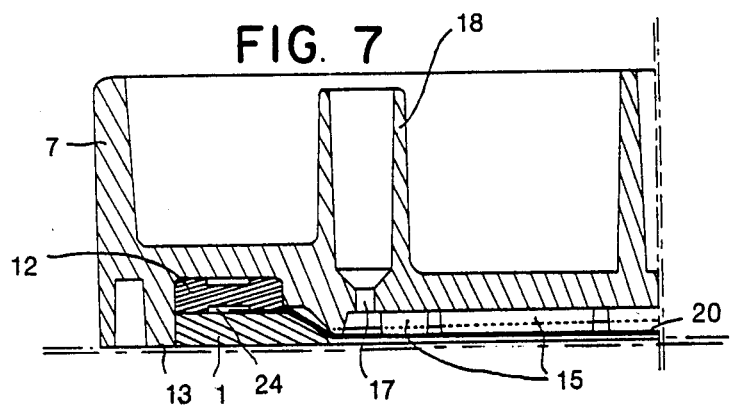
FIG. 7
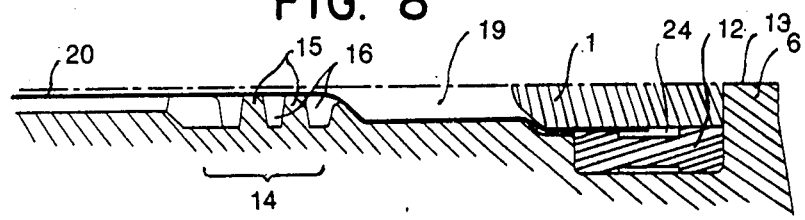
FIG. 8

SEMI-PERMEABLE MEMBRANE STRUCTURE THAT IS PARTICULARLY SUITABLE FOR PLASMAPHERESIS

BACKGROUND OF THE INVENTION

The present invention relates to a semi-permeable membrane structure, and more specifically to one which can be used for separation operations in the medical field, particularly for plasmapheresis operations.

Plasmapheresis structures themselves are known, for example as disclosed in PCT Application No. 81/00,102. In the membrane structures disclosed in this PCT Application, the membrane is folded over onto itself, which makes it possible to dispense with the need to provide a seal in the region of the fold in the membrane. However, in the disclosed apparatus, it is necessary to provide two passage holes on one side of the folded membrane and to place tubular sealing devices around these holes to allow the blood to pass through.

OBJECTS AND BRIEF STATEMENT OF THE INVENTION

It is an object of the present invention to provide a novel membrane structure which does not have the disadvantages of the prior art structures.

Accordingly, in furtherance of this object, in a membrane structure according to the present invention, the membranes that are used possess no passage holes for a fluid, and hence no special device has to be fitted to seal around any holes.

Another object of the present invention is to provide a structure which ensures a reliable seal around the periphery of each of the two membranes used, between which the fluid to be fractionated circulates.

Another object of the present invention is to provide a structure in which two plates supporting the membranes are identical and thus can be produced in the same mould.

Another object of the present invention is to provide a structure which has a minimal number of constituent elements and which is easy to mass produce.

A semi-permeable membrane structure that achieves these objects in accordance with the present invention and which is particularly suitable for use in plasmapheresis comprises, in combination:

a frame comprising two tubes each forming an internal passageway opening into the frame, a membrane on either side of the frame, each membrane mounted with its periphery supported on the frame, two external rigid plates each comprising, on its internal face, means for supporting a membrane and means for allowing the circulation of a fluid between the membrane and the internal face in question to a tube provided on the plate, with peripheral guides ensuring the separation between the two membranes facing one another, and means for keeping the two rigid plates fixed to one another.

The features and advantages of the present invention can be better appreciated with reference to the accompanying figures, which illustrate diagrammatically, by way of non-limiting examples, embodiments of the structure.

BRIEF DESCRIPTION OF THE DRAWINGS

FIG. 5 is a partial enlargement of FIG. 4;

FIG. 6 is a partial sectional view taken along line VI—VI of FIG. 1;

FIG. 7 is a partial section view taken along line VII—VII of FIG. 1;

FIG. 8 is a partial section view taken along line VIII—VIII of FIG. 1;

DETAILED DESCRIPTION OF PREFERRED EMBODIMENTS

Figure 3:
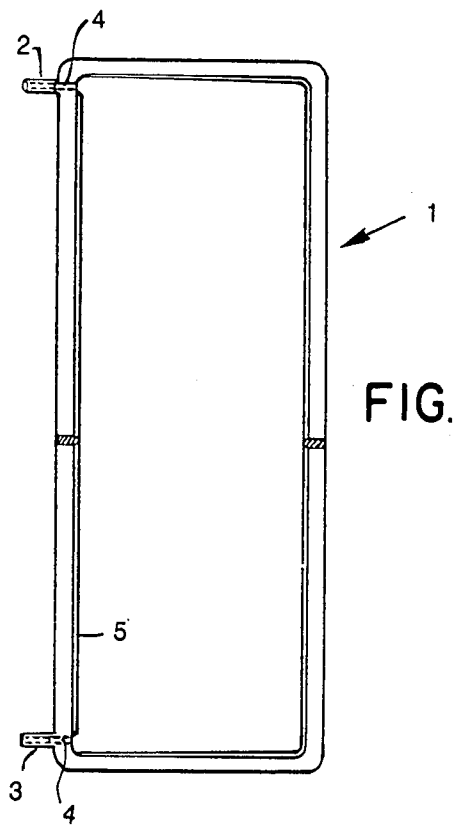
FIG. 3 illustrates an embodiment of the frame according to the present invention, and more particularly the embodiment corresponding to the structure of FIG. 1.
Figure 4:
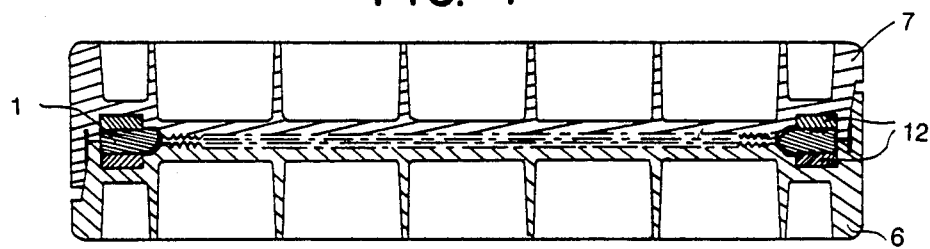
FIG. 4 is a sectional side view taken along the line IV—IV of FIG. 1.

The membrane structure illustrated in FIGS. 1 to 8 comprises a rigid frame 1 shown more particularly in FIGS. 3 and 6. This frame includes two tubes 2 and 3 each forming an internal conduit 4 passing through the body of the frame 1 and opening into the latter. This frame preferably has its internal edge 5 double bevelled (see, for example, FIG. 5) and has a constant thickness over the whole of its periphery. This frame 1 is preferably of rectangular shape, the tubes 2 and 3 being located towards the ends of one of the longer sides.

The structure shown in FIGS. 1 to 8 also comprises two rigid external plates 6 and 7 of generally rectangular shape. These two plates 6 and 7 are identical to one another (see FIG. 2) and can thus advantageously be produced with the same injection mould, for example. Each plate 6 and 7 comprises, on its internal face 8, means for supporting a membrane 20, these means being, for example, ribs 9 spaced at a distance from one another and defining grooves 10 between one another, as shown more clearly in FIG. 5. These ribs 9 and the grooves 10 are preferably parallel to the longitudinal axis of each plate 6 and 7. Each plate 6 and 7 comprises, towards its periphery and on its internal face 8, a recess 11 in which there are sealing means consisting of a flexible flat joint 12 of approximately the same size as the frame 1. Each plate 6 and 7 includes a "path", or peripheral support edge 13. On each internal face of each plate, towards the ends of the ribs 9, there is a recovery zone 14 for the fluid which has passed through the membranes (for example blood plasma), this zone 14 being located perpendicular to the longitudinal axis of each plate. This zone 14, shown more clearly in FIG. 8, comprises, for example, discontinuous ribs 15 on which a membrane 20 rests, the grooves 16 defined between these ribs 15 being in communication with a conduit 17 passing through the plate and communicating with an external tube 18, shown more clearly in FIG. 7.

Each plate 6 and 7 also comprises, on its internal face 8, transverse to the longitudinal axis of the plate and towards each end, a distribution zone 19 over the whole width of the zone comprising the ribs 9. This distribution zone is for the fluid which is to circulate between the membranes 20. Preferably, each distribution zone 19 is deeper and wider on the side corresponding to the tubes 2 and 3 when the two tubes 2 and 3 are located on one and the same side (as is the case with the frame shown in FIG. 3), for a better distribution of the fluid circulating between the membranes 20.

Each plate 6 and 7 also comprises, at its periphery, lateral "tabs" (or tongues) 21 and complementary recesses 22, the tabs on the plate 6 being inserted into the recesses in the plate 7, and vice-versa. The plates 6 and 7 can be fixed to one another by ultrasonic welding, for example at the points identified by the number 23, according to any suitable known technique.

In summary, the membrane structure illustrated in FIGS. 1-8 comprises:
 a rigid frame 1 of rectangular shape,
 two membranes 20 on either side of this frame 1, each membrane of rectangular shape being in contact with the ribs 9 and 15 of the plate which support it and resting on one face of the frame 1, without covering it completely, (as best shown in FIGS. 5, 6 and 8),
 two flat seals 12 of rectangular shape, their shape corresponding to that of the frame 1, and
 two identical external plates 6 and 7 welded to one another, the internal face 8 of each of them supporting one of the two membranes 20 by virtue of the ribs 9 and 15.

The thickness of the sheet of fluid that circulates between the two membranes 20 is determined by the edge supports or paths 13 which serve as a bearing for the plates 6 and 7 when the apparatus is assembled. More particularly, during assembly the two plates 6 and 7 are brought together until the paths or edges 13 come into contact. This results in an apparatus of constant height. Thus, in the apparatus depicted in FIGS. 1 to 8, for a particular plate 6 or 7, the height of the edge 13, relative to the base plane of the plate, is greater than the combined heights of the ribs 9 and the membrane 20. Referring to the partial sectional view of FIG. 8, the dot-and-dash line corresponds to the height of the edge 13 and the distance between this dot-and-dash line and the membrane represents half the thickness of a sheet of fluid circulating between the two membranes 20.

As regards the flat joint seals 12, they preferably have, at least on their face in contact with the membrane 20, a recess or cavity 24 located over the whole of this particular surface. This cavity 24 is of generally rectangular shape (as is each seal) when it is viewed in plan. The width and depth of this cavity 24 are preferably such that, when the edges of the plates 6 and 7 are in contact, the raised and recessed faces of each seal 12 in contact with the membrane 20 lie approximately in the same plane because of the clamping forces. This is not shown in the figures so that the shape of each unclamped seal 12 is shown more clearly. This cavity 24 makes it possible to envision that, for each joint 12, there is a double seal due to a double peripheral thickness, part of the face of the joint 12 pressing on the membrane 20 and the other part of the same face of the joint in question pressing on the frame 1. This embodiment of the seals 12 is particularly advantageous when the membranes 20 are "woven", that is to say when they are made of a woven fabric or a porous non-woven fabric (for strengthening the mechanical properties) coated with a collodion having semipermeability properties. In fact, in the past it has proved relatively difficult to ensure a perfect seal with such "woven" membranes, because the fluid which passes through the membrane sometimes passes over the edge of the membrane via the strengthening element. With the seal 12 as shown, it can be appreciated that the part of the seal pressing on the frame 1 serves as a second safety seal to the extent that the part of the seal 12 in contact with the membrane 20 would allow the passage of part of the fluid which passes through the membrane.

Figure 1:
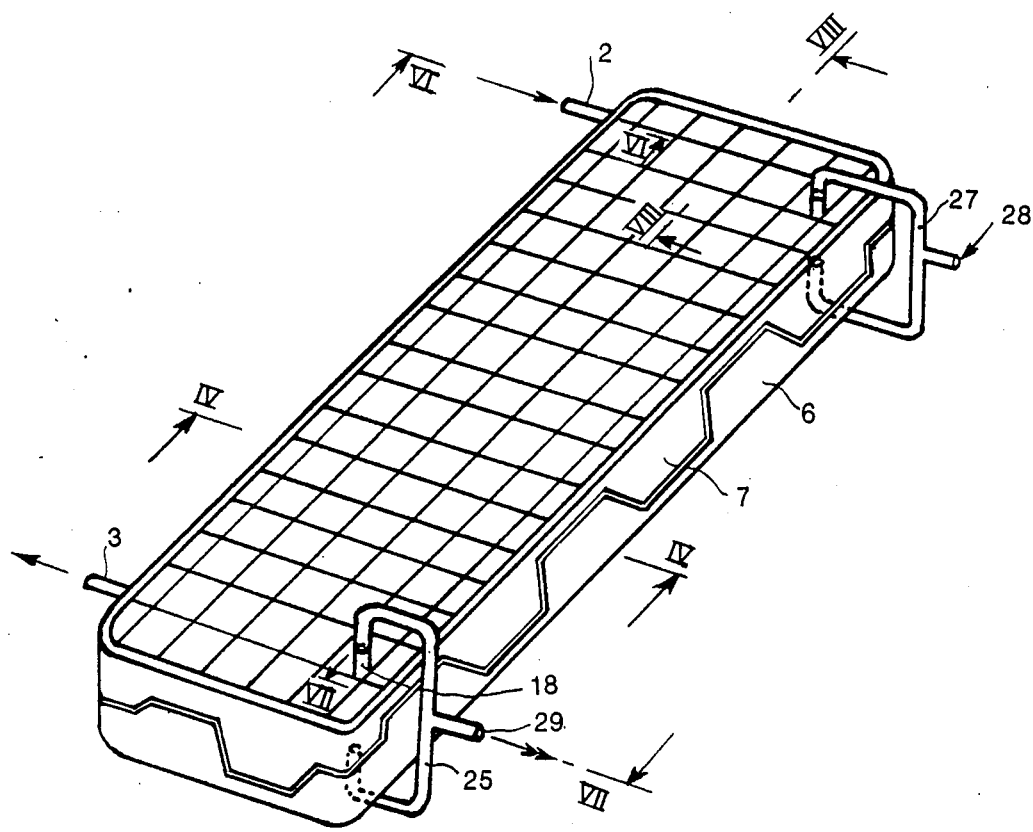
FIG. 1 diagrammatically illustrates an embodiment of a membrane structure according to the present invention, the structure being in perspective and viewed from the outside.
Figure 2:
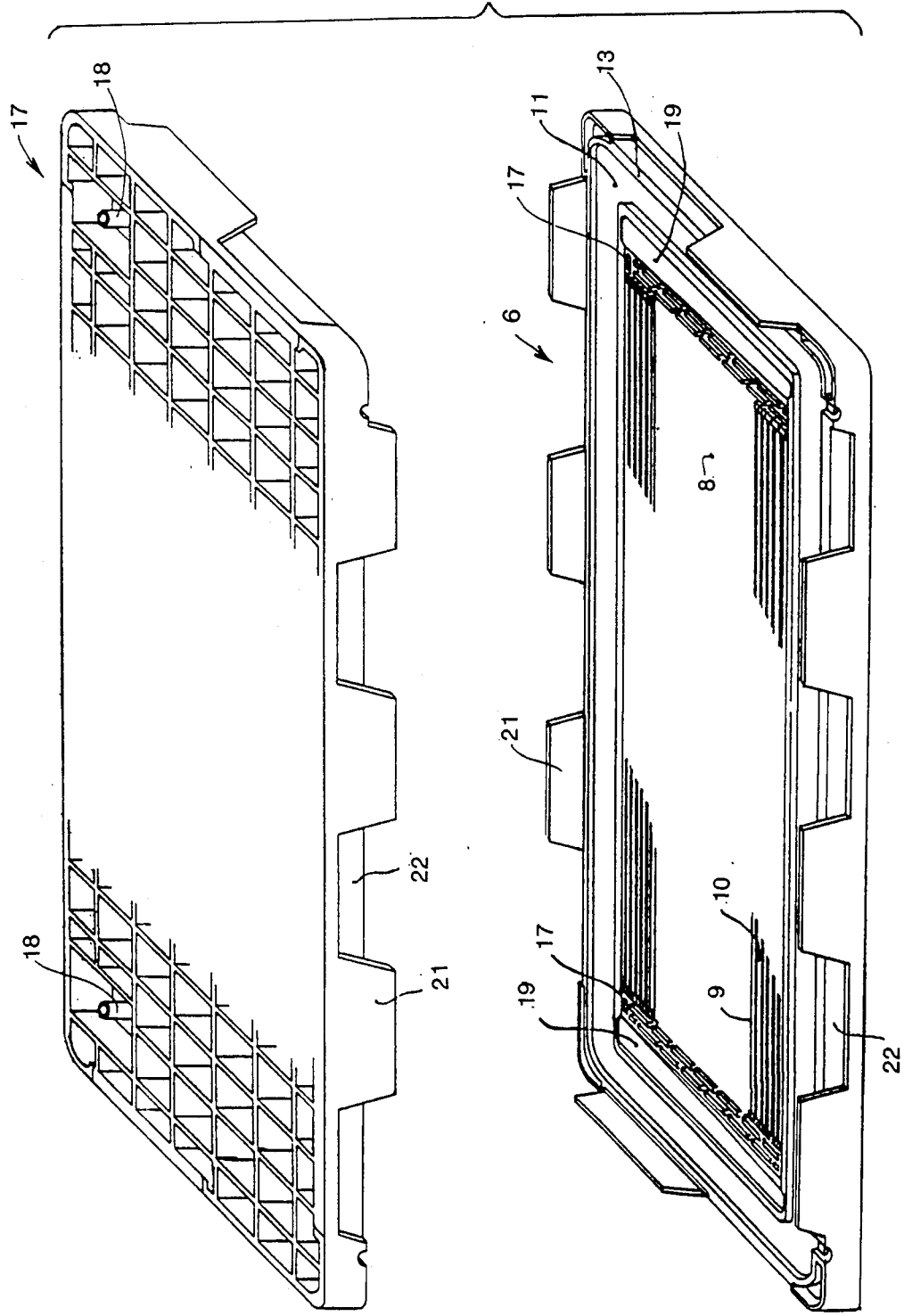
FIG. 2 is a perspective view of the two external plates of the structure shown in FIG. 1.

FIG. 1 shows an exemplary method of use, in plasmapheresis, of the membrane structure of FIGS. 1-8. In this case, the plates 6 and 7 can be injection molded and made, for example, of ABS (a polymer based on acrylonitrile, butadiene and styrene). The joint seals 12, which can also be injection molded, are preferably made of a silicon elastomer marketed by the Company RHONE-POULENC (reference ESP 31 902/40 SHORE A). The membranes 20 can have a thickness of approximately 120 microns and be woven, using a single-filament woven fabric made of poly-(ethylene glycol) terephthalate having a mesh size of 75 microns, a filament diameter of 55 microns and a void factor of 33% for example. The collodion giving the membrane semipermeability is based on an acrylonitrile/methyl methacrylate/sodium methallylsulphonate copolymer comprising 7.75% by weight of methyl methacrylate and 80 milliequivalents/kg of acid sites. This polymer has a specific viscosity of 0.3 at 20° C. in a dimethylformamide solution having a concentration of 2 g/l. The rejection factor of this membrane is:
 5 to 15% for a latex with a calibrated particle size of 0.27 micron,
 65 to 80% for a latex with a calibrated particle size of 0.4 micron,
 98 to 100% for a latex with a calibrated particle size of 0.64 micron.

The method of determining this latex rejection factor is described in detail on pages 6 and 7 of French Patent Application 82/00,485, the disclosure of which is incorporated herein by reference thereto.

The plates 6 and 7 each provide a useful separation area of 300 cm$^2$ (10×30 cm) and the thickness of the sheet of blood circulating between the membranes 20 is 370 microns.

During a plasmapheresis operation in the course of which the patient, in good health, donates part of his blood plasma, a possible procedure is as follows. The blood coming from the donor arrives in the apparatus via the tube 2, is distributed in the zone 19 between the membranes facing one another, and then circulates between the membranes 20 as far as the zone 19 towards the other end of the plates 6 and 7. The blood then leaves the apparatus via the tube 3 and returns to the patient after the removal of part of its plasma, which is passed through the membranes 20. The circulation of the blood is shown diagrammatically in FIG. 1 by the single-headed arrows. The plasma which has passed through the membranes 20 passes into the grooves 10 and then into the grooves 16, and is recovered via the tubes 18. In the structure shown in FIG. 1, the plasma outflow is shown diagrammatically by the double-headed arrow.

The structure shown in FIG. 1 is preferably used in a slightly inclined position, with the back of the apparatus being higher. Thus, the plasma only leaves via the two tubes 18 at the front of the structure, these two tubes 18 preferably being connected, as shown, by a plastic Y-shaped device 25. The two tubes 18 at the back of the apparatus, in a higher position, serve, for example, as air inlets for maintaining atmospheric pressure in the plasma compartments of the apparatus. With reference to FIG. 1, it can be seen that the tubes 18 at the back of the structure can be connected by a plastic device 27 whose inlet 28 carries, for example, a porous plug (not shown,) making it possible to preserve the sterility of the plasma directly collected in a flexible bag (not shown) at the outlet 29 of the device 25. In this method of use of the apparatus, the blood circulating between the membranes 20 is quite obviously at a pressure greater than atmospheric pressure throughout the apparatus.

The membrane structure described above can advantageously be used in the process and equipment of French Patent Application 82/00,485, the disclosure of which is herein incorporated by reference thereto.

Figure 9:
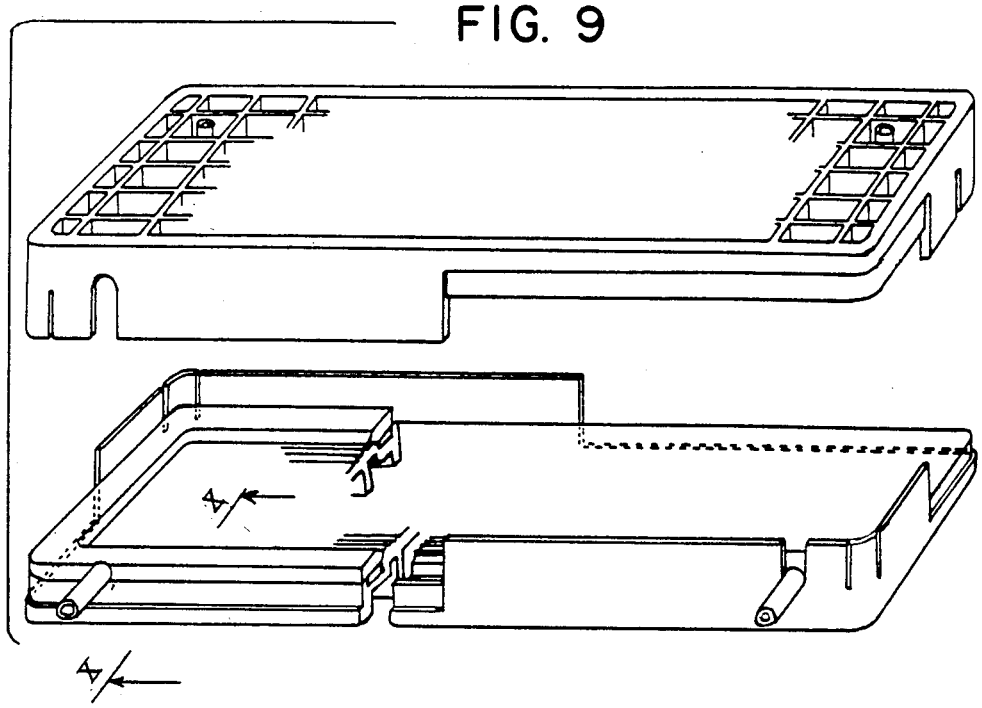
FIG. 9 is a perspective view of another embodiment of a membrane structure implementing the present invention.
Figure 10:
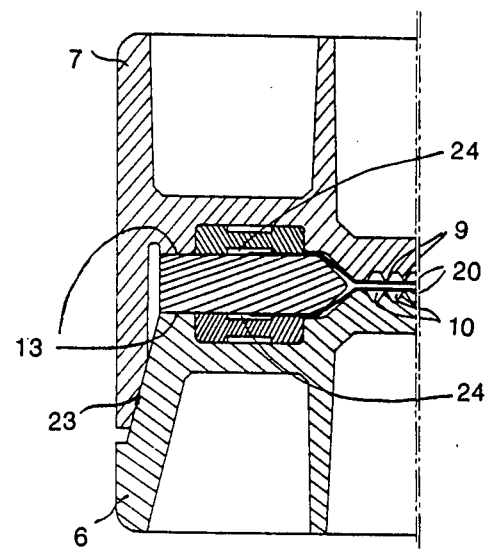
FIG. 10 is a partial section view taken along line X—X of FIG. 9.

Numerous variants of the apparatus described above are within the skill of those having familiarity with this art. FIGS. 9 and 10 show an apparatus roughly equivalent to that shown in FIGS. 1 to 8, in which the plates 6 and 7 have tongues 21 and recesses 22 of a different shape from those of the apparatus described previously, and in which the two plates 6 and 7 are also identical to one another. In the apparatus illustrated in FIGS. 9 and 10, all the constituent elements of the apparatus described previously are to be found again, the difference being the fact that the rigid frame 1 is clamped between the two edges of support paths 13 of the plates 6 and 7, and thus the frame plays a part in determining the thickness of the sheet of fluid circulating between the two membranes 20.

Figure 11:
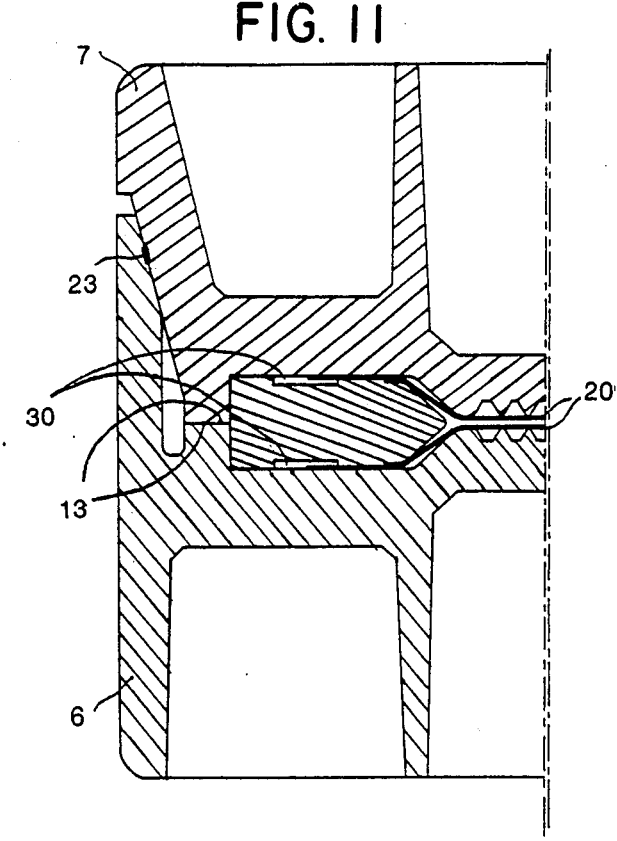
FIG. 11 is a partial section view showing another embodiment of the present invention.

FIG. 11 shows another embodiment of a membrane structure according to the present invention, the characteristic of this latter structure being that it has a flexible frame 1. Thus, it is not necessary to have the two sealing joints 12 provided in the structure as shown in FIGS. 1 to 10. In this structure, the paths 13 of the plates 6 and 7 are in contact with one another and determine the thickness of the sheet of fluid circulating between the membranes 20. The flexible frame 1 can advantageously possess, on each face, a recess 30 accommodating the edge of the membrane 20 which it clamps against the plate 6 or 7 when the structure is assembled. This recess 30, like the recess 24 in the joint seals 12 ensures a double seal in the region of the membrane, due to the two thicknesses on either side of this recess 24. The depth and width of the recesses 30 are such that, when the structure is assembled for use, the faces of the recesses are approximately plane with the clamping surfaces of the frame due to the compression of the flexible frame 1. This feature is not shown in FIG. 11, so that the shape of the frame 1 before clamping can be seen more clearly. The flexible frame 1 is preferably of rectangular shape, like the rigid frame 1 of the structures described previously. The recesses 30 are preferably also of rectangular shape, when viewed in plan.

Figure 12:
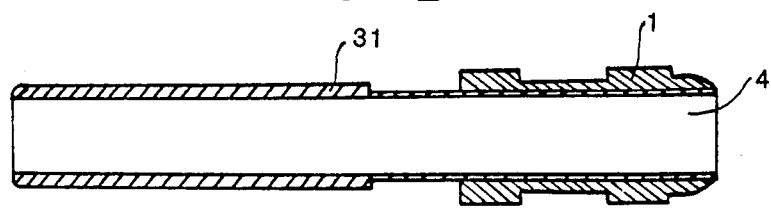
FIG. 12 is a partial cross-section illustrating the region where the fluid which circulates between the membranes is introduced or discharged, showing an embodiment of the frame in this region.

Since the flexible frame 1 is compressed in the structure, it might be advantageous to utilize a rigid plastic element 31 (FIG. 12) in this frame for the tubes 2 and 3, to ensure a better geometry of the conduit line 4 for the fluid circulating between the two membranes.

Moreover, although the structures disclosed herein have tubes 2 and 3 on one and the same side of the frame 1, it may be beneficial to arrange these tubes 2 and 3 so that they are diagonally opposite one another. The distribution zone 19 for the fluid circulating between the membranes can then be of uniform depth and width across the whole width of the apparatus.

Other variations within the scope of the invention will be apparent to those having familiarity with the art. For example, it is possible to provide interrupted ribs 9 on each internal face 8 of the plates 6 and 7, or to replace them by membrane support points (e.g. a "multipoint" system). It is also possible to dispense with the tongues 21 and the corresponding recesses 22 of the external plates 6 and 7 and to fix the plates to one another by other known means such as lateral rails, metal U-shaped devices, screw devices or the like. However, the tongues 21 and recesses 22 are preferred.

As regards the uses of the structures described above, apart from plasmapheresis, they can be used, with the appropriate membranes, for the separation of certain components from plasma, for leucopheresis and the like, and, more generally, for separation in the medical field. By way of example, the structure can be used with two membranes 20 having different separation characteristics, and each filtrate can be recovered independently.

It will be appreciated by those of ordinary skill in the art that the present invention can be embodied in other specific forms without departing from the spirit or essential characteristics therof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A semi-permeable membrane structure, comprising the combination of:
    a frame including spaced peripheral side walls which define a hollow interior;
    two tubes in said side walls, each providing an internal passageway that opens into the hollow interior of the frame;
    membrane means on either side of said frame for forming an unobstructed fluid channel therebetween, the periphery of each of said membrane means being disposed on said frame such that fluid introduced into the interior of said frame flows unobstructed between the two opposed surfaces of said membrane means;
    two opposed rigid plates disposed on respective sides of said frame, each of said plates having on its internal face means for supporting said membrane means and means for allowing the circulation of a fluid between said membrane means and said internal face, and a peripheral support edge for ensuring a separation between said membrane means; and
    means for fixing the two rigid plates to one another.

2. The membrane structure of claim 1, wherein said frame is rigid and further including two flat seals located on either side of the frame and having approximately the same shape as the frame, to ensure a seal between each of said membrane means and the frame.

3. The membrane structure of claim 2, wherein each of said flat seals includes, at least on its face in contact with one of said membrane means, a cavity accommodating the edge of said membrane means.

4. The membrane structure of claim 2 wherein each of said plates includes a recess adjacent its periphery for housing said frame and one of said seals, and further wherein the support edges of each plate are in contact with one another and located closer to the periphery of the plates than said recesses.

5. The membrane structure of claim 1 wherein said rigid frame is in contact with the support edges of each plate and thereby ensures separation between said membrane means.

6. The membrane structure of claim 1, wherein said frame is flexible and is located between the two plates in a recess provided in each of said plates such that a seal around the periphery of each of said membrane means is ensured by the compression of the frame onto the membrane means adjacent to the bottom of each recess, and wherein said two peripheral support edges are in contact with one another.

7. The membrane structure of claim 6, wherein said flexible frame includes, on two opposite faces, recesses in which the edges of the membrane means are accomodated.

8. The membrane structure of claim 1, wherein said structure is of generally rectangular shape.

9. The membrane structure of claim 1, wherein said two plates are substantially identical.

10. The membrane structure of claim 1, wherein said fixing means includes complementary tongues and recesses on each of said plates, with the tongues on one of said plates being ultrasonically welded into the recesses on the other of said plate.

* * * * *